United States Patent
Holmes et al.

(10) Patent No.: US 9,144,866 B2
(45) Date of Patent: Sep. 29, 2015

(54) TURBINE TRANSITION PIECE (TP) APPARATUS AND METHOD

(71) Applicant: General Electric Company, Schenectady, NY (US)

(72) Inventors: James Bradford Holmes, Fountain Inn, SC (US); James Robert Hollis, Greenville, SC (US); Wayne David Sullivan, Wilmington, NC (US)

(73) Assignee: General Electric Company, Schenectady, NY (US)

( * ) Notice: Subject to any disclaimer, the term of this patent is extended or adjusted under 35 U.S.C. 154(b) by 342 days.

(21) Appl. No.: 13/714,856

(22) Filed: Dec. 14, 2012

(65) Prior Publication Data

US 2014/0165397 A1  Jun. 19, 2014

(51) Int. Cl.
  *B23P 19/00* (2006.01)
  *B23P 19/04* (2006.01)
  *F01D 9/02* (2006.01)
  *F01D 25/28* (2006.01)
  *F23R 3/60* (2006.01)
  *B23P 11/00* (2006.01)

(52) U.S. Cl.
  CPC ............... *B23P 19/042* (2013.01); *B23P 11/00* (2013.01); *F01D 9/023* (2013.01); *F01D 25/285* (2013.01); *F23R 3/60* (2013.01); *F05D 2230/64* (2013.01); *F23R 2900/00017* (2013.01); *F23R 2900/00019* (2013.01); *Y10T 29/49236* (2015.01); *Y10T 29/53974* (2015.01)

(58) Field of Classification Search
  CPC ........ B23P 19/04; B23P 19/042; B23P 19/12; B23P 19/10; B23P 15/008; B23P 2700/13; F23R 2900/00017; F23R 2900/00019; F01D 25/28; F01D 25/285; Y10T 29/53961; Y10T 29/53974; Y10T 29/53909; Y10T 29/53913; Y10T 29/4932; Y10T 29/49323; F05D 2230/64; F05D 2230/644
  See application file for complete search history.

(56) References Cited

U.S. PATENT DOCUMENTS

| | | |
|---|---|---|
| 5,911,680 A | 6/1999 | Takeoka |
| 6,141,862 A | 11/2000 | Matsui et al. |

FOREIGN PATENT DOCUMENTS

JP       201164112 A  * 3/2011  ................ F02C 7/00

* cited by examiner

*Primary Examiner* — Jason L Vaughan
(74) *Attorney, Agent, or Firm* — Ernest G. Cusick; Hoffman & Warnick LLC

(57) ABSTRACT

Various embodiments include an apparatus for installing or removing a transition piece (TP) in a gas turbine. The apparatus can include: a control arm assembly sized to rest within an opening in the gas turbine; a guide system coupled to the control arm assembly, the guide system for transporting the TP within the opening in the gas turbine; and a counter balance coupled to the guide system, the counter balance for countering weight of the TP during the installing or the removing of the TP in the gas turbine.

10 Claims, 4 Drawing Sheets

TURBINE TRANSITION PIECE (TP) APPARATUS AND METHOD

FIELD OF THE INVENTION

The subject matter disclosed herein relates to power systems. More particularly, the subject matter relates to turbine systems and associated installation/removal apparatuses (or, tools).

BACKGROUND OF THE INVENTION

Conventional turbines, such as gas turbines, generally include three sections: a compressor section, a combustor section and a turbine section. In some gas turbine engine designs, a duct, known as a transition piece (or simply, transition), also referred to as a "TP" extends between the combustor section and turbine section. The transition piece (TP) serves many purposes, one of which is to direct the hot gases produced in the combustor section to the turbine section.

In order to ensure proper operation of the gas turbine engine, the inlet end of the TP and the combustor section should be aligned with precision. However, conventional installation and alignment methods can be cumbersome, time consuming, labor intensive, unsafe, and require manual mathematical calculations. Consequently, rework operations have been common when such conventional methods are employed.

BRIEF DESCRIPTION OF THE INVENTION

Various embodiments include an apparatus for installing or removing a transition piece (TP) in a gas turbine, and associated methods. In some cases, the apparatus can include: a control arm assembly sized to rest within an opening in the gas turbine; a guide system coupled to the control arm assembly, the guide system for transporting the TP within the opening in the gas turbine; and a counter balance coupled to the guide system, the counter balance for countering weight of the TP during the installing or the removing of the TP in the gas turbine.

A first aspect of the invention includes an apparatus for installing or removing a transition piece (TP) in a gas turbine. The apparatus can include: a control arm assembly sized to rest within an opening in the gas turbine; a guide system coupled to the control arm assembly, the guide system for transporting the TP within the opening in the gas turbine; and a counter balance coupled to the guide system, the counter balance for countering weight of the TP during the installing or the removing of the TP in the gas turbine.

A second aspect of the invention includes an apparatus for installing or removing a transition piece (TP) in a gas turbine. In some cases, the apparatus includes: a control arm assembly sized to rest within an opening in the gas turbine; a guide system coupled to the control arm assembly, the guide system including a first end with a mount for coupling to the TP, and a second end opposing the first end, the guide system for transporting the TP within the opening in the gas turbine; and a counter balance coupled to the second end of the guide system, the counter balance for countering weight of the TP during the installing or the removing of the TP in the gas turbine.

A third aspect of the invention includes a method including: coupling a transition piece (TP) apparatus with a transition piece (TP), the TP apparatus including: a control arm assembly sized to rest within an opening in the gas turbine; a guide system coupled to the control arm assembly, the guide system for transporting the TP within the opening in the gas turbine; and a counter balance coupled to the guide system; and installing or removing the transition piece from the gas turbine, wherein the counter balance counters weight of the TP during the installing or the removing of the TP in the gas turbine.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

Figure 1:
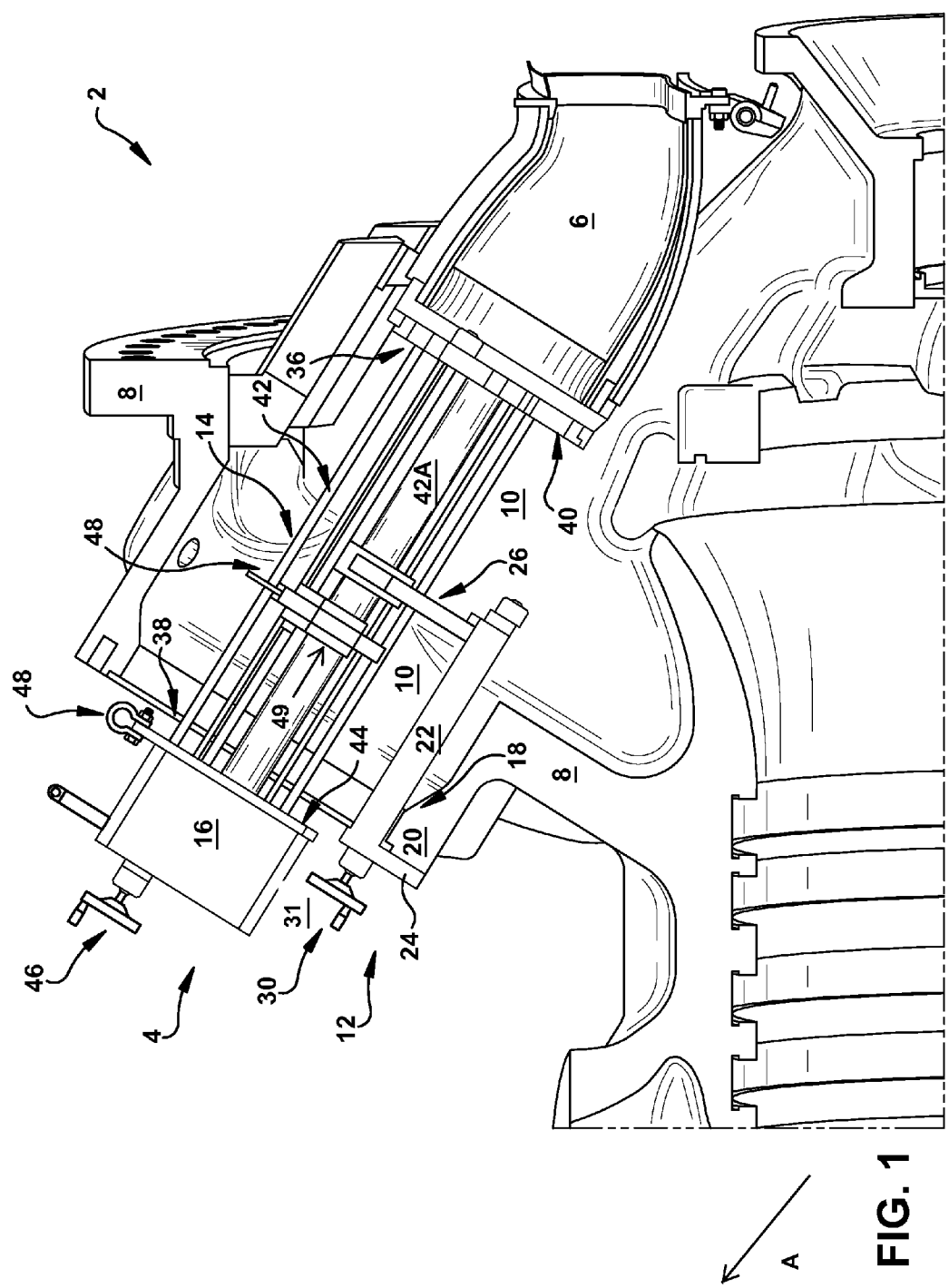
FIG. 1 shows a schematic cut-away view of a gas turbine along with an apparatus, according to various embodiments of the invention.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As noted, the subject matter disclosed herein relates to power systems. More particularly, the subject matter relates to turbine systems (e.g., gas turbines) and associated installation/removal apparatuses.

As described herein, in order to ensure proper operation of the gas turbine engine, the inlet end of the TP and the combustor section should be aligned with precision. However, conventional installation and alignment methods can be cumbersome, time consuming, labor intensive, unsafe, and require manual mathematical calculations. In particular, the significant weight of the TP (approximately 200 pounds) can make installation very difficult. Traditionally, a human operator must reach into the gas turbine engine and place the TP in its desired location using a rail-based system. The operator can have difficulty properly installing the TP due to its weight and the distance it must travel before it can be coupled to the gas turbine engine.

In contrast to conventional approaches, various embodiments of the invention include an installation apparatus (or, tool) for a gas turbine TP which includes a counter-balance and a control arm. The counter-balance and control arm can be used as rigging (or fulcrum) points when inserting and/or removing the TP from the engine.

In some cases, the installation tool can include a mating surface (e.g., a round plate) which is designed (sized) to contact a cylindrical forward surface of the TP. This mating surface can act as a bearing surface between the TP and the installation tool. The mating surface (e.g., plate) can be connected to the installation tool's guide system, and together, these elements can be used to transport the TP within an opening in a gas turbine engine. The tool can further include a counter balance (e.g., a head counter weight assembly), which is connected with the mating surface via a rod or tube (e.g., a steel rod or tube). As will be described herein, that counter balance can be used as a secondary rigging point for the tool.

This rod/tube of the guide system can be centered about the tool and serve as a positioning guide for one of the rigging points. The rod/tube of the guide system can also function as a control arm slide. On a second end of the rod/tube of the guide system, a coupling mechanism (e.g., a plate) can be used to couple the guide system with the counter balance. Once the guide system is coupled to the TP and mounted on the opening of the turbomachine (for either installation or removal of the TP, the counter balance can help to counter the weight of the TP during installation and/or removal.

Varying the position of the adjustment member (e.g., the acme screw) can actuate movement of a secondary rigging point (also referred to as a slideable weight-shifting mechanism) which can vary the center of gravity (CG) of the tool-TP coupling. That is, movement of the weight-shifting mechanism relative to the rod/tube of the guide system modifies the center of gravity of the joined tool and TP based on where the point lies along the length of the tool.

In various embodiments, the guide system includes a plurality of connecting members (e.g., rods) that can run the length of the guide system, from the counter balance to the mounting surface, to connect to the mounting features of the TP. The guide system, including these connecting members (rods), allows the tool and the TP to remain in contact throughout the installation/removal process.

In some embodiments, the weight-shifting mechanism (or, secondary rigging point) can be adjusted by turning an adjustment knob on an upper end of the rod (outside of the opening in the turbomachine). The counter balance can act as a forward end counter weight, and serve as a mounting point for several other features of the tool. That is, the counter balance assembly can act as a forward attachment point during the lifting and installation, or removal. In various embodiments, the counter balance assembly includes at least one swivel eye bolt attachment point. In some cases, the counter balance assembly serves as a mounting point for an acme screw adjustment wheel which is actuatable by an operator (e.g., by turning the wheel) to vary the CG by changing the position of the weight-shifting mechanism.

In other embodiments, additional features attached to the assembly include an operator's manipulation wheel. This can be a stationary wheel that includes a ring and spokes. The spokes attach the ring to the counter balance assembly and afford the operator mechanical advantage to manipulate the fixture. The control arm slide can be utilized in combination with the control (and support) arm. The control/support arm can be designed to bolt to a compressor discharge (CDC) casing of the gas turbomachine (turbine) at a plurality of locations so the orientation of the control/support arm can be varied depending on the desired angle of entry In many cases, the control/support arm is positioned directly below the center point in the vertical direction of the parts as they are installed or removed. This control/support arm can align with the control arm support guide to support the load as the TP is installed or removed. The control/support arm can include an acme screw that can be used to vary the position of the control arm during the installation or removal processes.

In various embodiments, the tool can include an operator's wheel attached to the acme screw in order to actuate movement of the control arm along the length of the control assembly. The position of the control arm can be varied so that the support point coincides with the secondary rigging point (also referred to as the weight-shifting mechanism) of the TP installation tool. This support arm can be utilized at the half way point of the installation or removal.

Various particular embodiments of the invention include an apparatus for installing or removing a transition piece (TP) in a gas turbine. The apparatus can include: a control arm assembly sized to rest within an opening in the gas turbine; a guide system coupled to the control arm assembly, the guide system for transporting the TP within the opening in the gas turbine; and a counter balance coupled to the guide system, the counter balance for countering weight of the TP during the installing or the removing of the TP in the gas turbine.

In various particular embodiments, an apparatus for installing or removing a transition piece (TP) in a gas turbine is disclosed. The apparatus can include: a control arm assembly sized to rest within an opening in the gas turbine; a guide system coupled to the control arm assembly, the guide system for transporting the TP within the opening in the gas turbine; and a counter balance coupled to the guide system, the counter balance for countering weight of the TP during the installing or the removing of the TP in the gas turbine.

Various other particular embodiments of the invention include an apparatus for installing or removing a transition piece (TP) in a gas turbine. In some cases, the apparatus includes: a control arm assembly sized to rest within an opening in the gas turbine; a guide system coupled to the control arm assembly, the guide system including a first end with a mount for coupling to the TP, and a second end opposing the first end, the guide system for transporting the TP within the opening in the gas turbine; and a counter balance coupled to the second end of the guide system, the counter balance for countering weight of the TP during the installing or the removing of the TP in the gas turbine.

Various additional embodiments of the invention include a method, e.g., a method of installing and/or removing a TP from a gas turbine. In some cases, the method can include: coupling a transition piece (TP) apparatus with a transition piece (TP), the TP apparatus including: a control arm assembly sized to rest within an opening in the gas turbine; a guide system coupled to the control arm assembly, the guide system for transporting the TP within the opening in the gas turbine; and a counter balance coupled to the guide system; and installing or removing the transition piece from the gas turbine, wherein the counter balance counters weight of the TP during the installing or the removing of the TP in the gas turbine.

Figure 2:
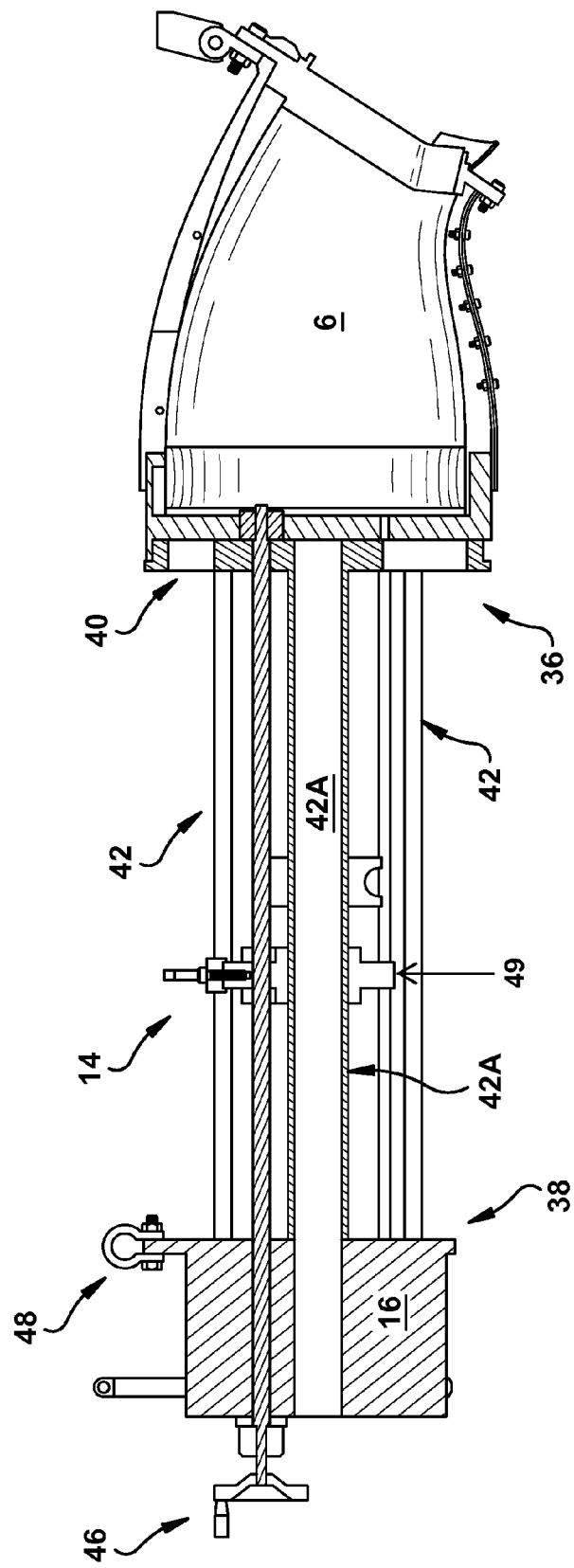
FIG. 2 shows a schematic three-dimensional side view of a guide system section of the apparatus of FIG. 1 according to various embodiments of the invention.
Figure 3:
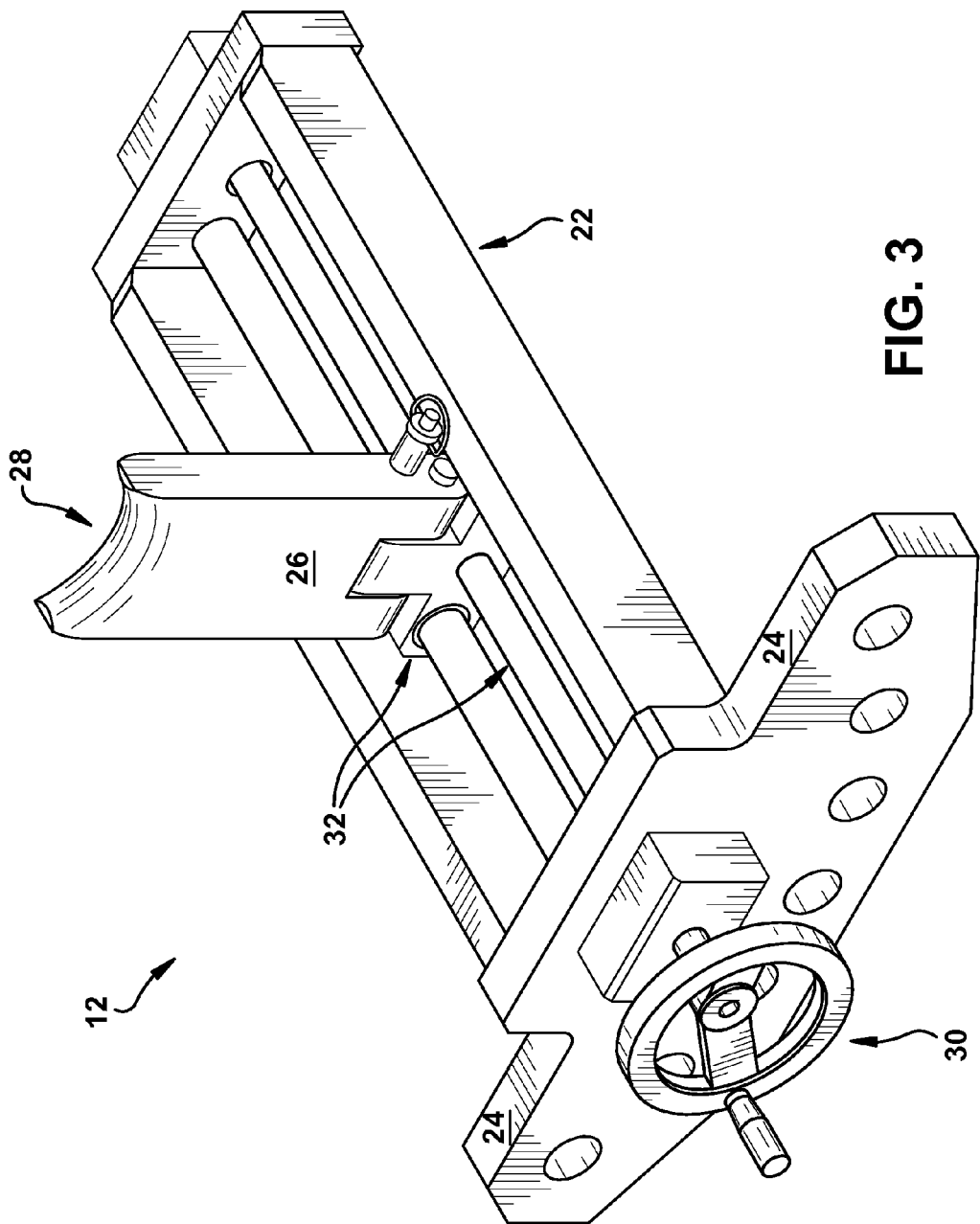
FIG. 3 shows a schematic perspective view of an adjustment apparatus of the apparatus of FIG. 1 according to various embodiments of the invention.

Turning to FIG. 1, a schematic cut-away view of a portion of a gas turbine 2 along with an apparatus 4 for installing or removing a transition piece (TP) 6 is shown according to various embodiments of the invention. FIG. 2 shows a schematic three-dimensional side view of a guide system, counterbalance, and transition piece, coupled according to various embodiments of the invention. FIG. 3 shows a three-dimensional perspective view of a control arm assembly according to various embodiments of the invention. In describing various embodiments of the invention, reference is made primarily to FIG. 1, however certain features will be more clearly understood in view of FIG. 2 and/or FIG. 3.

Returning to FIG. 1, as is known in the art, the gas turbine 2 includes a compressor discharge chamber (CDC) 8, which includes an opening 10 (referred to herein as an "opening", "gas turbine opening" or "opening in the gas turbine"). As is further known in the art, the compressor discharge chamber 8 can be joined with a combustion chamber (not shown) of the gas turbine system 2 by the transition piece (TP) 6. That is, the TP 6 acts as a transition component between the CDC 8 and the downstream combustion chamber. The depiction in FIG.

1 shows a snapshot of the apparatus 4 during the installation or removal of the TP 6 from the opening 10 in the gas turbine 2 (particularly, the CDC 8).

As shown, the apparatus 4 can include a control arm assembly 12 (FIGS. 1 and 3) that is sized to rest within the opening 10 in the gas turbine 2. The apparatus 4 can further include a guide system 14 (FIGS. 1 and 2) coupled to the control arm assembly 12. The guide system 14 is for transporting the TP 6 within the opening 10 in the gas turbine 2. Also shown, the apparatus 4 can include a counter balance 16 coupled to the guide system 14, where the counter balance 16 can counter weight (e.g., a portion of the weight) of the TP 6 during installation and/or removal of the TP 6 from the gas turbine 2.

In more particular detail, the control arm assembly 12 (also shown in FIG. 3) can include a mount 18 for engaging a lip 20 proximate the opening 10 (where the lip 20 can rest at the entry to the opening 10, e.g., partially defining that opening 10). In some cases, the mount 18 is sized to extend within the opening 10, e.g., along an axis (A) of the opening 10. In various embodiments, the mount 18 includes a first section 22 extending along the axis (A), and a second section 24 which is substantially perpendicular to the first section 22. These sections 22, 24 can be formed as a singular unit (e.g., via casting), or may be formed of separate components and later joined (e.g., via welding, brazing or other conventional coupling methods). The first section 22 can be longer than the second section 24 in various embodiments. As shown, the second section 24 can rest against the lip 20, and can remain substantially outside of the opening 10 in some cases.

The control arm assembly 12 can also include a control arm 26, which can be coupled (e.g., mechanically coupled) to the first section 22. The control arm 26 can extend substantially perpendicularly from the second section 22, and can be configured to couple to the guide system 14 (e.g., allowing the guide system 14 to rest on the control arm 26). The control arm 26 can include a substantially rounded, curved, bowed, or otherwise recessed surface 28 (FIG. 3) for receiving a portion of the guide system 14. It is understood that in various embodiments, the control arm 26 is not fixedly coupled to the guide system 14. Further, the surface 28 of the control arm 26 can be formed of a material with a relatively low coefficient of friction, to allow the control arm 26 to move along the corresponding portion of the guide system 14 to which it is coupled. As described herein, the control arm 26 (and the overall control arm assembly 12) can support a portion of the weight of the guide system 14, and consequently, a portion of the weight of the TP 6 (when the TP 6 is coupled to the guide system 14.

Also shown in FIGS. 1 and 3, the control arm assembly 12 can include an adjustment member 30 that is configured to be accessible from a location 32 external to the opening 10 in the gas turbine 2. That is, the adjustment member 30 can be accessible from outside of the opening 10 during installation or removal of the TP 6, which allows an operator (e.g., a human operator) to transport the TP 6 within the opening 10 using the apparatus 4 without necessarily needing to reach into the opening 10. Shown more particularly in FIG. 3, the adjustment member 30 can include a crank, wheel, ratchet, etc. which can be coupled to a rail system 32 (FIG. 3) for transporting the control arm 26 along the mount 18 e.g., the first section 24 (and in practice, along the axis (A) of the opening 10). The rail system 32 can include a mechanical rail system (e.g., a gear-based rail system), a hydraulic rail system (e.g., using a hydraulic pump and cylinders), or any other suitable transport system coupled to the adjustment member 30.

Returning to FIG. 1 (and with reference to FIG. 2), when working as the apparatus 4, the guide system 14 can rest on the control arm 26 during installation and/or removal of the TP 6 from the opening 10. As shown, the guide system 14 can have a first end 36 coupled to the TP 6, and a second end 38 opposite the first end 36, the second end 38 coupled to the counter balance 16. The first end 36 can include a first mating surface (e.g., a plate) 40 for coupling with the TP 6, where the first mating surface 40 can include one or more conventional mating devices, e.g., clamps, screws, magnetic or suction-based components, etc. In some cases, the first mating surface 40 can include one or more male or female mating members for coupling with portions of the TP 6, e.g., without the need to reach into to opening 10 and perform the coupling.

The guide system 14 can also include at least one connecting member 42 (several shown) connecting the first end 36 and the second end 38. In some embodiments, a connecting member 42 can include one or more connecting rods 42A that connect through the first mating surface 40 to the TP 6. The connecting rod(s) 42A are used as a slide through the center of the apparatus 4 in such a way as to center the apparatus 4 to the TP 6. Rod(s) 42A act as structural members in the guide system 14. Further, the rod(s) 42A attach the counter balance 16 to the first mating surface (plate) 40. The connecting member 42 (e.g., a steel rod) can span from the first end 36 to the second end 38 of the guide system 14. In various embodiments, the connecting member 42 (e.g., rod 42A) can couple with (rest on) the control arm 26, as described herein.

The second end 38 of the guide system 14 can include a second mating surface 44 (e.g., a plate) for coupling with the counter balance 16. The second mating surface 44 can be coupled with the counter balance 16 via one or more fasteners, screws, pins, bolts, etc. In some cases, the counter balance 16 can include a dense metal or other composite which gives it a substantial weight relative to the remainder of the apparatus 4.

Returning to FIG. 1, in some cases, the apparatus 4 can include an additional adjustment member 46 coupled to the counter balance 16 (and the guide system 14) for modifying a position of the weight-shifting mechanism (also called the secondary rigging point) 49 along the guide system 14, e.g., along the rod 42A. The additional adjustment member 46 can include one or more of a wheel, crank, ratchet, movable pin, etc. that is connected to the weight-shifting mechanism 49. In some cases, (shown in FIG. 2), one of the connecting members 42 can include an externally threaded (or notched) rod or other mechanism which can couple to the weight-shifting mechanism 49, e.g., via complimentary threads or notches). Rotation of the additional adjustment member 46 can actuate movement of the weight-shifting mechanism 49 to move along the axis A (along the rod 42A). Movement of the weight-shifting mechanism 49 can actuate a change in the center of gravity (CG) of the apparatus. That is, in some cases, the additional adjustment member 46 can be used shift the center of gravity of the apparatus 4, either during installation into the opening 10 or removal from the opening 10, to aid an operator in installation and/or removal of the TP 6.

The apparatus 4 can also include at least one lifting point 48 (e.g., a hook, flange, etc.) which can be used to engage a lifting device (e.g., a complementary hook, crane, rod, etc., not shown) and aid in lifting the apparatus 4 at least partially into or out of the opening 10. Because the apparatus 4 includes a substantial amount of weight (particularly in the counter balance 16), and the TP 6 can weigh approximately 200 pounds (lbs), there may be times during installation and/or removal of the TP 6 using the apparatus 4 where additional lifting is beneficial. In these circumstances, the lifting points 48 can be utilized to aid in maneuvering the apparatus 4 (along with the TP 6).

Figure 4:
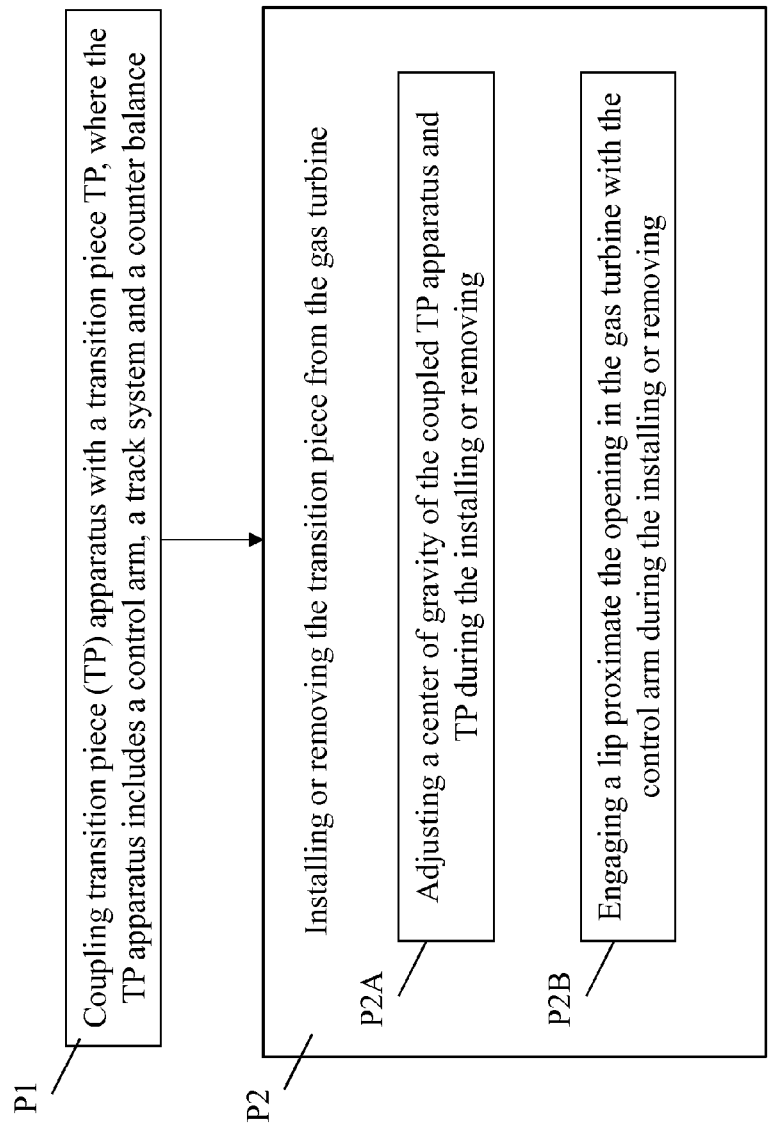
FIG. 4 shows a flow diagram depicting an illustrative method according to various embodiments of the invention.

FIG. 4 shows a process flow diagram illustrating a method according to various embodiments of the invention. These processes can apply to some of the apparatuses and components shown and described with reference to FIGS. 1-3, however, these processes are not intended to be limited to those particular components shown and described with reference to those Figures. As shown, the method can include:

Process P1: coupling a transition piece (TP) apparatus with a transition piece TP. In some cases, the apparatus can include: a control arm assembly sized to rest within an opening in the gas turbine; a guide system coupled to the control arm assembly, the guide system for transporting the TP within the opening in the gas turbine; and a counter balance coupled to the guide system; and Process P2: installing or removing the transition piece from the gas turbine, wherein the counter balance counters weight of the TP during the installing or the removing of the TP in the gas turbine. In some cases, process P2 can include one or both of the following sub-processes:

Process P2A: adjusting a center of gravity of the coupled TP apparatus and TP during the installing or the removing; and/or Process P2B: engaging the control arm with a lip portion of the opening in the gas turbine during the installing or the removing.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It is further understood that the terms "front" and "back" are not intended to be limiting and are intended to be interchangeable where appropriate.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. An apparatus for installing or removing a transition piece (TP) in a gas turbine, the apparatus comprising:
    a control arm assembly sized to rest within an opening in the gas turbine, the control arm assembly including a mount for engaging a lip proximate the opening in the gas turbine, the mount sized to extend within the opening along an axis of the opening;
    a guide system coupled to the control arm assembly, the guide system for transporting the TP within the opening in the gas turbine; and
    a counter balance coupled to the guide system, the counter balance for countering weight of the TP during the installing or the removing of the TP in the gas turbine,
    wherein the control arm assembly further includes a control arm coupled to the guide system, the control arm for supporting a portion of a weight of the guide system and a portion of the weight of the TP.

2. The apparatus of claim 1, further comprising a first adjustment member coupled to the counter balance and the guide system for adjusting a center of gravity of the apparatus along a primary axis of the guide system.

3. The apparatus of claim 2, wherein the guide system is coupled to the counter balance at a first end of the guide system, and wherein the guide system is configured to couple to the TP at an opposite end of the guide system.

4. The apparatus of claim 1, wherein the control arm assembly includes an adjustment member configured to be accessible from a location external to the opening in the gas turbine.

5. The apparatus of claim 1, further comprising a second adjustment member coupled to the control arm assembly for modifying a position of the control arm along the mount.

6. An apparatus for installing or removing a transition piece (TP) in a gas turbine, the apparatus comprising:
    a control arm assembly sized to rest within an opening in the gas turbine, the control arm assembly including a mount for engaging a lip proximate the opening in the gas turbine, the mount sized to extend within the opening along an axis of the opening;
    a guide system coupled to the control arm assembly, the guide system including a first end with a mount for coupling to the TP, and a second end opposing the first end, the guide system for transporting the TP within the opening in the gas turbine;
    a counter balance coupled to the second end of the guide system, the counter balance for countering weight of the TP during the installing or the removing of the TP in the gas turbine,
    wherein the control arm assembly further includes a control arm coupled to the guide system, the control arm for supporting a portion of a weight of the guide system and a portion of the weight of the TP;
    a first adjustment member coupled to the counter balance and the guide system for varying a center of gravity of the apparatus along a primary axis of the guide system from a position outside of the opening in the gas turbine; and
    a second adjustment member coupled to the control arm assembly for modifying a position of the control arm along the mount.

7. The apparatus of claim 6, further comprising at least one lifting point for receiving a lifting member during the installing or the removing of the TP in the gas turbine.

8. A method comprising:
    coupling a transition piece (TP) apparatus with a transition piece (TP), the TP apparatus including:
        a control arm assembly sized to rest within an opening in the gas turbine, the control arm assembly including a mount for engaging a lip proximate the opening in the gas turbine, the mount sized to extend within the opening along an axis of the opening;
        a guide system coupled to the control arm assembly, the guide system for transporting the TP within the opening in the gas turbine; and
        a counter balance coupled to the guide system,
        wherein the control arm assembly further includes a control arm coupled to the guide system, the control arm for supporting a portion of a weight of the guide system and a portion of the weight of the TP; and installing or removing the TP from the gas turbine, wherein the counter balance counters weight of the TP during the installing or the removing of the TP in the gas turbine.

9. The method of claim 8, wherein the installing or removing further includes adjusting a center of gravity of the coupled TP apparatus and TP during the installing or the removing.

10. The method of claim 8, further comprising engaging the lip proximate the opening in the gas turbine with the control arm during the installing or the removing.

* * * * *